United States Patent [19]

Pocholle et al.

[11] Patent Number: 5,105,428
[45] Date of Patent: Apr. 14, 1992

[54] POWER LASER SOURCE WITH OPTICAL CONTROL OF BEAM SCANNING

[75] Inventors: Jean-Paul Pocholle, Arpajon/La Norville; Michel Papuchon, Massy; Jean-Luc Ayral, Paris; Claude Puech, Ballainvilliers/Longjumeau, all of France

[73] Assignee: Thomson-CSF, Puteaux, France

[21] Appl. No.: 592,259

[22] Filed: Oct. 3, 1990

[30] Foreign Application Priority Data

Oct. 3, 1989 [FR] France ............... 89 12887

[51] Int. Cl.$^5$ .............................. H01S 3/10
[52] U.S. Cl. ........................... 372/24; 372/3; 372/21; 372/25; 372/30; 372/69; 359/327
[58] Field of Search ............ 307/426, 427; 372/21, 372/3, 24, 30, 69, 25; 330/4.3; 250/201.1, 201.9

[56] References Cited

U.S. PATENT DOCUMENTS

| H,742 | 2/1990 | Bobos et al. | 330/43 |
|---|---|---|---|
| 3,515,897 | 6/1970 | Culver | 307/426 |
| 3,815,043 | 6/1974 | Carman, Jr. et al. | 372/3 |
| 4,151,486 | 4/1979 | Itzkan et al. | 372/3 |
| 4,812,639 | 3/1989 | Byren et al. | 250/203 R |
| 4,949,056 | 8/1990 | Akkrapeddi | 330/4.3 |
| 4,993,031 | 2/1991 | White, III | 372/3 |

FOREIGN PATENT DOCUMENTS 0067082 12/1982 European Pat. Off. .
2438358 4/1980 France .
WO83/04145 11/1983 PCT Int'l Appl. .

OTHER PUBLICATIONS

IEEE Journl of Quantum Electronics, vol. 22, No. 3, Mar. 1991; "Analysis of Injection-Locked Gain-Guided Diode Laser Arrays"; pp. 396-401.

*Primary Examiner*—Georgia Epps
*Attorney, Agent, or Firm*—Oblon, Spivak, McClelland, Maier & Neustadt

[57] ABSTRACT

Disclosed is a laser source with beam scanning, of the type comprising: a pump laser source emitting a pump beam with a determined wavelength; a pressurized gas cell receiving the pump beam and emitting, by Raman effect, an output beam with a wavelength called a Stokes wavelength; a control light source transmitting a control beam to the gas cell, this control beam having a wavelength that is substantially equal to the Stokes wavelength; wherein said light source includes means for the spatial and/or temperal modification of the injection of the control photons of the control beam into said cell constituted by a multiple-laser strip structure, forming a power slave laser and cooperating with means for modifying the radiation pattern of said multiple-laser strip structure, so as to prompt the emission of the output beam in a variable direction.

5 Claims, 1 Drawing Sheet

POWER LASER SOURCE WITH OPTICAL CONTROL OF BEAM SCANNING

BACKGROUND OF THE INVENTION

1. Field of the Invention

The field of the invention is that of coherent optical sources of power with beams of variable direction.

These lasers are generally pulse lasers, the periodic operation of which makes it possible to present the intense energy desired during short periods of time.

Such sources are particularly valuable because they can be inserted into aiming systems with an external control enabling a multiple-tracking function to be carried out with a single source.

The aim of the present invention is to make a laser with control beam scanning wherein the principle of orientation of the beam is flexible in its use and easily configured.

2. Description of the Prior Art

In the field of the coherent optical sources, another patent application, filed on behalf of the same applicants, describes an assembly comprising a laser emitting a pump beam with a wavelength $\lambda p$ on a gas cell under pressure which, by Raman effect, emits an output beam at a Stokes wavelength ($\lambda s$). A diode or, again, a laser source pumped by laser diode, emits a control beam that has the same wavelength ($\lambda s$) as the output beam and is colinear with the pump beam. This enables a high-powered output signal to be obtained. A source of this type is shown in FIG. 1 and described in detail further below.

The originality of this assembly consists in the use of an external control of the Raman cell (diode, or diode-pumped laser source), enabling the making of a pulse source that is more stable in peak power, and is more reproducible from one operation to another.

In this type of source, the effective surface of the Raman wave tends to fit the profile of the surface of the pump wave. The goal pursued is to match the effective surfaces of the pump and RAMAN waves (identical surface and profile) so that the energy transferred is the maximum. In a semi-confocal type of cavity, it is possible to place the cell in an appropriate position in order to achieve this condition.

Finally, because of the external control, it is thus possible to modulate the period or, again, the emission power of the output beam. In one specific embodiment of this assembly, wherein the laser diode is replaced by a laser source pumped by laser diode, it is also possible to cause variation in the emission wavelength.

The aim of the present invention is to use this type of assembly with external control to obtain a variable orientation of the beam by means of an improvement.

SUMMARY OF THE INVENTION

According to the invention, the variable orientation of the beam is obtained by means of a pump laser source emitting a pump beam with a determined wavelength;

a pressurized gas cell receiving the pump beam (Fp) and emitting, by Raman effect, an output beam with a wavelength called a Stokes wavelength;

a control light source transmitting a control beam (Fc) to the gas cell, this control beam having a wavelength that is substantially equal to the Stokes wavelength;

wherein said light source includes means for the spatial and/or temporal modification of the injection of the control photons of the control beam (Fc) in said cell so as to prompt the emission of the output beam in a variable direction.

Unlike the case of the assemblies presented further above, it is therefore sought to obtain a specific spatial and angular distribution of the control beam in order to direct the output beam selectively, for example to obtain a beam scanning or a target tracking operation.

According to one preferred embodiment, said means of spatial and/or temporal modification of the control beam are constituted by a multiple-laser strip structure forming a power slave laser and cooperating with means for modifying the radiation pattern of said multiple-laser strip structure.

Advantageously, said means for modifying the radiation patter of the multiple-laser strip structure are constituted by means for controlling the spectral drift of a master laser, the variations in frequency of the beam emitted by said master laser providing, by coupling, for the selection of distinct modes of radiation of the multiple-laser strip structure.

In this case, according to a preferred embodiment, said means for controlling the spectral drift of the master laser are formed by means for controlling the current injected into said master laser.

Said means for modifying the radiation pattern of said multiple-laser strip structure include, for example, means for modifying the temperature of said multiple-laser structure and/or of said master laser.

In another embodiment, said means of spatial and/or temporal modification of the injection of the control photons are formed by an acousto-optical modulator.

BRIEF DESCRIPTION OF THE DRAWINGS

Other characteristics and advantages of the invention will emerge from the following description of a preferred embodiment, given by way of a non-restrictive illustration, and from the appended drawings wherein.

DETAILED DESCRIPTION OF THE INVENTION

The embodiment described hereinafter pertains to the making of power laser sources working in the 1.06 $\mu$m and/or 1.54 $\mu$m, 1.396 $\mu$m, 2.355 $\mu$m spectral windows.

The choice of the wavelength of emission in the spectral range located towards 1.5 $\mu$m is related to the fact that the risks of optical damage to the eye are reduced to the minimum and that, at this wavelength, the atmosphere provides a good window of transmission. It may be recalled that the maximum exposure permissible for the human eye is 5 $\mu$J/cm2 at 1.064 $\mu$m and goes to 1 J/cm2 at 1.54 $\mu$m. It follows that the making of power laser sources in this spectral field has undeniable advantages.

Figure 1:
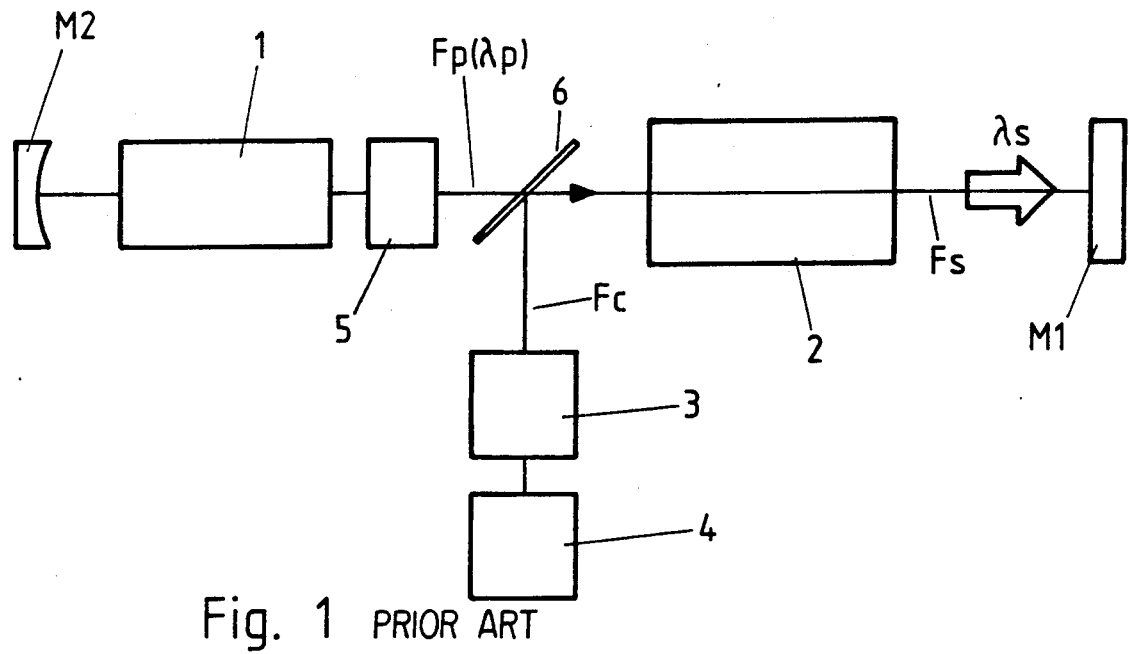
FIG. 1 shows the principle of operation of the Raman cell laser source, controlled by a control beam having a wavelength that is substantially equal to the output beam of the cell, as described in the above-mentioned other patent application.

The assembly of FIG. 1 corresponds to an assembly compatible with the implementation of the principle of optical control of beam scanning according to the invention. This device includes:

a laser rod 1 with external cavity emitting a pump beam Fp at a determined wavelength p;

a Q-Switch 5, enabling the laser 1 to be made to work in triggered mode;

a pressurized gas cell 2 receiving the pump beam Fp, the gas of said cell 2 being excited by this beam in such a way that, by Raman effect, it emits a beam Fs with a shift in frequency and in such a way that there is a transfer of energy from the pump beam Fp towards the pump beam Fs;

a control light source constituted by a control laser source 3 that is pumped by a laser diode 4 and emits, towards the gas cell 2, a control beam Fc at a wavelength substantially equal to that of the beam Fs;

two mirrors M1 and M2, located on either side of the laser 1 and the cell 2, constituting an optical cavity.

For the pump laser 1, we may use a power source based on yttrium fluoride (LiYF$_4$) doped with holmium (HO$^{3+}$), known as Ho:YLF. The wavelength of emission of a source such as this 1.396 micrometers. The gas cell 2 is based on methane (CH$_4$) under high pressure. A pump beam Fp emitted by the pump laser 1 prompts, by Raman effect, the emission of a Stokes wave with a wavelength of 2.355 micrometers. For the control source 3, then, a source is chosen based on thallium doping a YALO$_3$ matrix, the designation of which may be Tm:Cr$^{3+}$, (Cr$^{3+}$ is a dopant Co). This laser source may be doped longitudinally by means of a diode laser 4 emitting between 0.71 and 0.8 micrometer. The control beam Fc then has a wavelength of about 2.355 micrometers. Thus, a control of the Raman effect in the gas cell 2 is achieved.

The wave obtained by the Raman effect has the advantage of being located in the spectral range where the window of transmission of the atmosphere is transparent. An association such as this therefore enables a 2.355 micrometer power source to be made.

Another embodiment consists in using an Nd:YAG laser emitting at 1.3187 micrometers and a Raman cell, based on hydrogen under pressure, giving a Stokes wave at the wavelength λs of 2.916991 micrometers.

The laser source 3 is then a holmium-based source doping a material YA1O$_3$ (designated by Ho: YA1O$_3$). This source 3, excited by a laser diode, emits at a wavelength p of about 2.918 micrometers.

The matching of the two wavelengths (λp and λs) is done by means of a control of the composition of the gas of the Raman cell (pressure, temperature, mixture) and by playing on the parameters of the laser cavity of the crystal Ho:YA1O$_3$.

In another embodiment, not shown, the mirror M1 may be located just behind the Q-switch 5 of the assembly of FIG. 1. In this case, the optical cavity contains the laser 1, but does not contain the gas cell 2. This gas cell is in the path of the pump beam Fp but outside the optical cavity, and the Raman amplification in this cell 2 is therefore done from outside the active cell.

This arrangement enables the control beam Fc to be made strictly colinear with the pump beam Fp, without there having to be any fear of an optical return to the control source 3, which could be the case in the device of FIG. 1, if the control beam Fc and pump beam Fp were to be strictly colinear.

The superimposition of the control beam Fc and of the pump beam Fp can be done by means of a separating plate 6, positioned in the paths of the pump beam Fp and the control beam Fc and suitably oriented with respect to these beams.

The object of the control source 3 is to inject the optical wave 2 into the cell 2 where the Raman non-linear process develops.

According to the invention, it is possible to control this process spatially and temporally.

Indeed, if the control beam has a smaller beam dimension than that corresponding to the spatial distribution of the Raman gain, the mechanism of transfer from the pump wave towards the Stokes wave will be favored in the space into which the photons initiating the Raman process are injected.

The Raman mechanism may be described through the equation:

$$P_s(x,y) = P_s^o(x,y)exp(-a_s(x,y)z + g_R P_p^o(x,y) L_{eff}/A_{eff}(x,y))$$

$P_s^o(x,y)$ and $P_p^o(x,y)$ representing respectively the signal power (at the frequency of the Stokes wave in the Raman process) and the pump power injected into the gas medium, which is the seat of the Raman effect. The other parameters represent:

$g_R$: the Raman gain of the medium;

$a_s(x,y)$: the losses at the Stokes frequency;

$A_{eff}(x,y)$: the effective surface covered by the two beam sections at the Stokes and pump frequencies;

$L_{eff}$: the effective length of interaction taking account of the losses on the pump wave;

One of the means enabling a spatial modification of the injection of the control photons consists in using an acousto-optical modulator.

Figure 2:
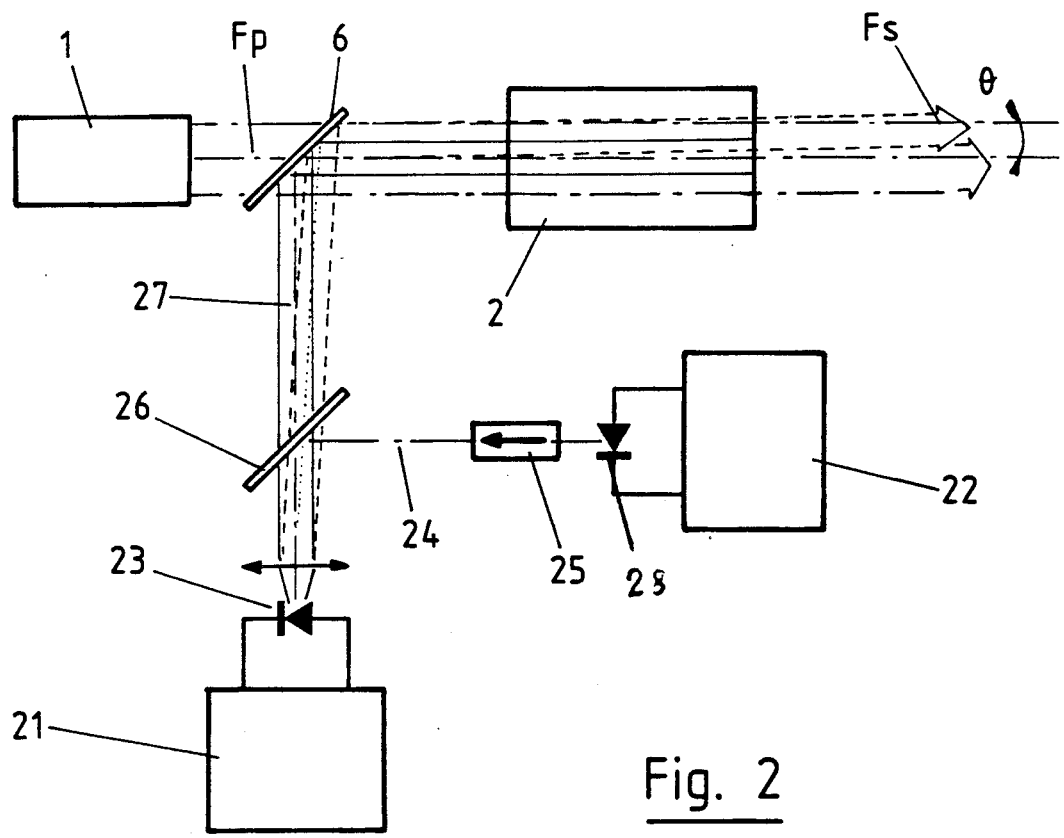
FIG. 2 is a diagram of a preferred embodiment of the invention, illustrating the principle of use of a master laser/slave laser module giving an optical command for angular scanning by the output beam of the Raman cell in the assembly of FIG. 1.

Another possibility is based on the use of the phasing mechanisms and on the control of this phasing on semiconductor laser structures of the "phase arrays" type. This embodiment is illustrated in FIG. 2.

The structure of the source, similarly to the assembly of FIG. 1, includes an Nd:YAG type power laser 1 that pumps a Raman cell 2, filled with a pressurized gas selected as a function of the desired Raman frequency shift.

An injection laser 21 controls the triggering of the Raman process. Should the gas used in the Raman cell be methane or hydrogen, the control laser 21 may be made with InGaAs/InP semiconductor compounds.

This laser 21 is a "slave" laser formed by a multiple-laser strip structure, having a plurality of medium-powered emitting diodes 23. These multiple-laser strip structures offer an emission frequency spectrum having several emission lines.

The strip structure cooperates with a "master" oscillator laser 22, which illuminates the system of diodes 23 by means of a beam 24 going through an isolator 25 and a separating plate 26.

Th "master" laser 22/"slave" laser 21 structure works as follows:

The master laser 22 is a single-frequency laser injecting a signal with a given frequency. The frequency of emission of its beam 24 is, for example, controlled by the injection current of the laser.

The control principle lies in controlling the drift of the wavelength of emission of the master laser 22, so as to enable the beam 24 to get locked into one of the modes of emission of the strip structure of the slave laser 21. In other words, the selective control of one of the modes of emission of the strip of diodes 23 is done by the injection, using the beam 24 emitted by the master laser 22, of the frequency corresponding to this inherent mode of radiation of the strip of diodes.

It is the selection of this mode of radiation of the slave laser 21 that enables control over the angular shift $\theta$ of the output beam Fs of the Raman cell 2.

Indeed, the strip of parallel-coupled diodes 23, forming the slave laser 21, is strongly multimode in nature. It offers many possibilities of configuration of the optical intensity, each of which can be activated selectively. To each mode of emission, there corresponds a frequency, and an inherent field configuration, i.e. a distribution of intensity of emission that is specific for each frequency of the spectrum.

In controlling the master laser 22, and more precisely the frequency of the beam 24, the mode of operation of the slave laser 21 is controlled by modifying the field close to the strip of laser sources 23. In this way, the radiation pattern of the slave laser 21, and hence of the control source of the Raman cell 2, are modified.

Each configuration of the radiation pattern corresponds to a spatial distribution of the beam 27. Owing to the alignment of the emission diodes 23 in the strip, the selection of a mode of emission corresponds, therefore, to an angular variation of the control beam 27. Thus, through the separating plate 6, a control beam with a favored direction is injected into the non-linear medium of the Raman cell 2. This control beam therefore preferably activates the triggering of the transfer of power from the pump wave Fp, coming from the pump laser 1, towards the Stokes wave of the output beam Fs of the cell 2.

The control of the frequency of the beam 24 emitted by the master laser 22 is done, for example, by a control of the current injected into the master laser. Another embodiment consists in modifying the temperature, either of the emitting diode 28 of the master laser 22 or of the emitting diodes 23 of the slave laser 21.

The foregoing different objects and characteristics have been given purely as non-restrictive examples, and other variants may be contemplated without going beyond the scope of the invention. The numerical examples and the examples of materials used have been given only to illustrate the embodiment presented.

What is claimed is:
1. A power laser source with beam scanning of the type comprising:
   a pump laser source emitting a pump beam having a determined wavelength;
   a pressurized gas cell receiving said pump beam and emitting, by Raman effect, an output beam having a wavelength called a Stokes wavelength;
   a control light source transmitting a control eam to said gas cell, said control beam having a wavelength that is substantially equal to said Stokes wavelength;
   said control light source including means for at least one of spatial and temporal modification of the injection of control photons of said control beam in said gas cell so as to prompt the emission of said output beam in a variable direction, wherein said means for at least one of spatial and temporal modification of the control beam comprises a multiple-laser strip structure forming a power slave laser and means for modifying the radiation pattern of said multiple-laser strip structure.

2. A laser source according to claim 1, wherein said means for modifying the radiation pattern of the multiple-laser strip structure comprise means for controlling the spectral drift of a master laser, the variations in frequency of a beam emitted by said master laser providing, by coupling, for the selection of distinct modes of radiation of said multiple-laser strip structure.

3. A laser source according to claim 2, wherein said means for controlling the spectral drift of said master laser are formed by means for controlling a current injected into said master laser.

4. A laser source according to any one of the claims 2 and 3, wherein said means for modifying the radiation pattern of said multiple-laser strip structure include means for modifying the temperature of at least one of said multiple-laser structure and of said master laser.

5. A laser source according to claim 1, wherein said means for at least one of spatial and temporal modification of the injection of the control photons are formed by an acousto-optical modulator.

* * * * *